United States Patent [19]

Boisvert et al.

[11] Patent Number: 5,276,508
[45] Date of Patent: Jan. 4, 1994

[54] ANALOG SIGNAL PROCESSOR FOR ELECTRONIC IMAGING SYSTEM PROVIDING HIGHLY ACCURATE REPRODUCTION OF IMAGES

[75] Inventors: David M. Boisvert, Rochester; Charles E. McLellan, Kendall, both of N.Y.

[73] Assignee: Eastman Kodak Company, Rochester, N.Y.

[21] Appl. No.: 971,885

[22] Filed: Nov. 5, 1992

[51] Int. Cl.⁵ .......................... H04N 9/07; H04N 5/14
[52] U.S. Cl. .................................... 358/48; 358/21 R;
   358/41; 358/27; 358/160; 358/172; 307/353;
   328/151; 328/104
[58] Field of Search ...................... 358/41, 43, 44, 48,
   358/21; 307/353, 359, 243; 328/104, 128, 127,
   151, 154; H04N 5/14

[56] References Cited

U.S. PATENT DOCUMENTS

| | | | |
|---|---|---|---|
| 3,737,564 | 6/1973 | Bruinsma | 358/27 |
| 4,262,258 | 4/1981 | Gaalema | 307/353 |
| 4,484,226 | 11/1984 | Parker | 358/29 |
| 4,745,461 | 5/1988 | Shirai | 358/21 R |

OTHER PUBLICATIONS

M. H. White, et al., "Characterization of Surface Channel CCD Image Arrays at Low Light Levels", *IEEE Journal of Solid-State Circuits*, vol. SC-9, No. 1, Feb. 1974, pp. 1-13.
M. Nayebi and B. A. Wooley, "A 10-bit Video BiCMOS Track-and-Hold Amplifier", *IEEE Journal of Solid-State Circuits*, vol. 24, No. 6, Dec. 1989, pp. 1507-1516.
M. Nayebi, "Video BiCMOS Sampling Systems" (Doctoral Thesis), Stanford University, Stanford, Calif., 94305.

*Primary Examiner*—Mark R. Powell
*Assistant Examiner*—Sherrie Hsia
*Attorney, Agent, or Firm*—Raymond L. Owens

[57] ABSTRACT

An electronic imaging system employs a linear charge coupled device (CCD) imaging unit and a unique analog signal processor (ASP) implemented on a single integrated circuit chip. The ASP has a plurality of matched signal channels for receiving respective pixel image signals from the CCD unit and for providing respective color-component image signals, such as red, green and blue color-components, having amplitude balance and accurately referenced "zero" levels. The ASP also has a plurality of matched multiplexing units which directly combine the separate color-component signals from the signal channels into a single full color output image signal with the color components in timed sequence. The output signal from the ASP is applied to an analog to digital (A/D) converter and then to a digital signal processor (DSP). By virtue of its unique design, the ASP has a dynamic range of greater than 12-bits with an output signal frequency as high as 20 MHz for high throughput rates.

6 Claims, 2 Drawing Sheets

ANALOG SIGNAL PROCESSOR FOR ELECTRONIC IMAGING SYSTEM PROVIDING HIGHLY ACCURATE REPRODUCTION OF IMAGES

FIELD OF THE INVENTION

This invention relates to a very high performance, cost effective electronic analog signal processor for imaging systems utilizing charge coupled devices (CCD's) or the like to provide high quality electronic images, such as virtually perfect electronic image reproductions of high resolution color film photographs.

BACKGROUND OF THE INVENTION

Recent years have seen the rapid development of photo-sensing charge coupled devices (CCD's) for electronic imaging of an actual scene or an image. Because of their many advantages (small size, low power, low cost, etc.), CCD's have become the imaging units of choice in many applications. CCD's are being used more and more in various imaging systems requiring very high resolution, full color balance, and wide dynamic range. By way of example, applications requiring very high performance of an electronic imaging system are found in the satellite imaging of fine features on the earth's surface from hundreds of miles in space, and in the near-perfect reproduction of an image from a frame of high resolution color film.

A CCD (change coupled device) photo-imaging unit typically has light sensing cells closely spaced apart in horizontal lines with the lines being closely spaced vertically. In one example of a CCD unit, termed a "linear CCD unit", there are thousands of such cells in each horizontal line and there are three such lines of cells very closely spaced vertically. Each line of cells reproduces a respective primary color (e.g., red, green and blue) of an image. A lengthwise portion of an image, such as a color photograph on a frame of 35 mm film, is then optically focused on the lines of cells. Each cell provides an electronic signal corresponding to the respective color intensity of a tiny portion, termed a pixel, of the image. The linear CCD unit is then scanned optically across the width of the 35 mm film frame to reproduce electronically the complete photographic color image on the film.

There are certain characteristics of a CCD photo-imaging unit which must be compensated for by the electronic analog signal circuitry which receives and processes the video signals produced by the CCD unit in order to obtain a truly high quality image. The electrical signal stored at each cell of the CCD unit is related to the intensity-time exposure of the light of an image incident on the area of that particular cell. The individual cells are made small (e.g., about 15 microns square) in order to obtain a large number of pixels along a line length (e.g., many thousands per length). Each cell has high impedance and the electrical signal obtainable from each cell (representing an image pixel) is relatively small (e.g., a volt or so). Therefore, even small levels of noise, such as thermal noise and switching transients within the CCD unit, become a significant factor which affects the quality of an image reproduced by the CCD unit.

An extensive discussion of CCD imaging units and some of the problems associated with them is given in an article by M. H. White, et al., entitled "Characterization of Surface Channel CCD Image Arrays at Low Light Levels", *IEEE Journal of Solid State Circuits*, Vol. SC-9, No. 1, February 1974, pages 1-14. This article describes the theory and operation of a CCD imaging unit and describes a method termed correlated double sampling (CDS) "to remove switching transients, eliminate the Nyquist noise associated with the reset switch/node capacitance combination, and suppress '1/f' surface-state noise contributions of a CCD unit". A schematic diagram of a CDS signal processor employing the method of correlated double sampling is shown in FIG. 5 on page 4 of this article.

As is well known, the individual cells of a CCD unit are adapted by means of respective color masks (filters) applied over the cells to respond to respective color components of an image. For example, certain cells are covered with red (R) masks, other cells by green (G) masks, and the remaining cells by blue (B) masks. Thus the R, G and B color components of an image are separately detected by respective ones of the R, G and B cells in a CCD unit. However, because of the differences in light transmittance of the green masks versus the red masks and the blue masks, the sensitivity of cells to green light is substantially greater than the sensitivity of the cells to red light or to blue light. The "green" cells generate (for a given total image brightness) substantially greater electrical output signals than do the "red" or the "blue" cells. It is necessary therefore to compensate for these differences in the R, G, and B signal outputs in order to obtain "amplitude balance" in an electronically reproduced image. In a linear CCD imaging unit, amplitude balance is easily accomplished by electronically controlling the "time exposures" (by means of control voltages) of the respective lines of R, G and B cells, as is well known in the art. When the R, G and B cells do not receive any light (i.e., total darkness), they still produce a small minimum "dark" signal voltage. Since the three lines of R, G and B cells in a linear CCD unit are all the same (only the color masks are different), the "dark" (no light) signals are substantially the same for all of the cells. Thus the linear CCD unit has a uniform "dark" signal characteristic of the R, G and B cells, along with amplitude balance of the respective signal color components R, G and B needed to reproduce a high resolution electronic color image.

The dynamic range of an analog image signal is conveniently expressed as a binary bit number. Thus an 8-bit number (with a decimal equivalent of 256) expresses the ability of a circuit to divide (digitize) the signal accurately into 256 parts. This in turn implies that noise and distortion contribute less than one part in 256 parts (about ½ percent) of the total image signal. By way of example, experimental high definition color television systems have a dynamic range of about 10-bits (the decimal equivalent of 1024), whereas color film typically has A dynamic range of 12 to 14-bits (with a decimal equivalent of 4,096 to 16,384). It is desirable therefore, in producing photographic-quality electronic color images using a CCD imaging unit to have an analog signal processor (ASP) for the output of a CCD imaging unit which has a dynamic range greater than 12-bits. Achieving such a wide dynamic range for an electronic imaging system of the kind described above implies that an analog signal processor (ASP) used to process the output signals from a CCD unit must itself cause less than about 0.014 signal distortion. By way of example, for a one volt CCD image signal, this means that the ASP should introduce less than about 100 microvolts total error into the high frequency analog image signals. This has been very difficult and expensive, if not impossible to do, with prior art signal processors.

Errors caused by an ASP which previously have been considered negligible when only an 8 to 10-bit dynamic range was acceptable, must now be either avoided or considerably reduced if an error level as low as 0.01% is to be achieved. In particular, several sources of error now become significant. These are as follows: minor timing differences in the actuation of sampling switches used in an ASP or ASPs to sample the high frequency CCD pixel image signals; signal-dependent charge-injection (causing "pedestal errors") occurring during turn-off of the sampling switches; and small thermally induced differential changes in the operating times and levels of the ASPS. The levels of these errors are so low (e.g., only a few millivolts) that it has previously been difficult to further reduce them without introducing other sources of error, or without adding greatly to the cost and complexity of the system.

A discussion of some of the considerations involved in designing a low noise track-and-hold amplifier (useful in an ASP such as may be employed in conjunction with a CCD imaging unit) is given in an article by M. Nayebi and B. A. Wooley, entitled "A 10-bit Video BICMOS Track-and-Hold Amplifier", *IEEE Journal of solid State Circuits*, Vol. 24, No. 6, December, 1989, pages 1507–1516. A doctoral Thesis written by Mr. Nayebi (Mohammed Reza Nayebi) at Stanford University, December, 1989, entitled. "Video BICMOS Sampling Systems" (available from Stanford University, Stanford, Calif., 94305), contains a related and much more extensive discussion.

It is highly desirable from the standpoint of low cost, small size, uniform quality, etc. to be able to implement an ASP as an integrated circuit (IC). The architecture of a circuit may impose limitations on the way in which it can be implemented as an IC. Conversely, there may be limitations on the performance of the circuit resulting from how it is implemented as an IC. The present invention provides a unique architecture for an ASP which is readily implemented as a single IC, and which achieves an overall dynamic range of greater than 12-bits in processing multiple signals from a linear CCD imaging unit, for example.

SUMMARY OF THE INVENTION

The present invention is directed to an electronic imaging system which comprises a linear CCD imaging unit and an analog signal processor (ASP) especially adapted for operation with such an imaging unit. The ASP simultaneously samples and processes through matched signal channels thereof separate amplitude balanced color-component image signals from the linear CCD unit. The ASP directly multiplexes the color-image signals from each of its respective signal channels to obtain full color single channel output image signals with a high throughput rate (e.g., 15 MHz). The single channel output signal of the ASP is applied to an analog to digital (A/D) converter and thence to a digital signal processor (DSP). The ASP has an improved architecture which readily permits it to be implemented as an integrated circuit on a single chip. This new ASP has a plurality of signal channels which are so closely matched relative to each other (within microscopic limits of component uniformity, tight limits of signal timing, and minuscule thermal gradients) that the channels operate substantially identically. As a result, the separate color-component pixel image signals from the linear CCD imaging unit are each processed with an accuracy to less than about 0.01% error. The color-component signals of each signal channel are very accurately referenced to a predetermined "zero" level established by a reference voltage or voltages. By virtue of its architecture, timing differences in the operation of the respective signal channels of the ASP are held to less than ten picoseconds, and thermal gradients are kept so small that an overall dynamic range of substantially greater than 12-bits is achievable.

In accordance with an aspect of the invention, there is provided on a single integrated circuit (IC) chip an analog signal processor (ASP) which simultaneously processes through separate matched signal channels of the ASP color-component pixel image signals (e.g., red, green and blue) from an imaging unit, such as a linear CCD unit, having a high impedance output. Each signal channel of the ASP provides correlated double sampling noise reduction of a respective input color-component signal and then samples and processes that signal with combined noise and other errors of less than about 100 microvolts. The output of each channel is of low impedance and the respective signals at these outputs have their "zero" levels accurately referenced to a reference voltage. Each channel of the ASP has a solid-state sampling switch. These switches are physically located in close proximity to each other and are (within tight limits) identically matched in their opening and closing characteristics. Thus the timing in the actuation of these switches is held to within a few picoseconds of each other. As a result, signal sampling level changes due to circuit ringing and timing differences are substantially eliminated and the respective signal channels for the same amplitude of input signals produce output signals which are matched to better than 0.01% of each other. The outputs of the signal channels are then directly multiplexed and applied to a low impedance output by a matched pair of multiplex units. The three color-component image signals are combined by the multiplex units into a full color image signal comprising a timed sequence of the color-component image signals. For a given throughput of output image signals, each of the signal channels of the ASP operates at a fraction (e.g., one third) of the frequency of the output signals. This lower frequency of operation of each signal channel (relative to the output frequency) permits a higher gain, lower bandwidth for a given gain-bandwidth factor, and this in turn results in lower noise within the signal channels. Thermal gradients within the single IC chip of the ASP are minimal. Hence normal temperature changes which would otherwise (as in the case of previous analog signal processor arrangements fabricated on multiple IC chips or from discrete components) destroy the channel balance and timing accuracy needed for a 12-bit dynamic range, have virtually no effect here.

Viewed from another aspect, the present invention is directed to an electronic imaging system comprising an imaging unit and an analog signal processor (ASP). The imaging unit has a plurality of outputs for simultaneously producing respective color-component pixel image signals. The ASP simultaneously processes the respective pixel image signals from the imaging unit to provide full color output image signals at an output thereof. The ASP comprises a plurality of substantially identical signal channels, which are matched and balanced relative to each other, and multiplexing means. Each signal channel comprises a first portion having an input and an output with the input being adapted to receive a separate one of the color-component signals, and further comprises a second portion having a signal node and a sampling switch with the sampling switch being coupled between the output of the first portion and the signal node. The second portion has an output and is adapted to sample analog signals received from the output of the first portion and to hold a signal level of a sampled analog signal. All of the sampling switches are essentially identical and are portions of a common integrated circuit and are located with respect to each other such that with common control signals applied thereto, the sampling switches all switch substantially in unison. The multiplexing means, which have inputs coupled to the outputs of the second portions of the signal channels and have an output coupled to the output of the ASP, for combining separate signals from the signal channels into full color output signals at the output thereof such that the separate signal channels, for a given signal throughput rate, operate at a frequency inversely proportional to the number of channels relative to the frequency of the full color signals at the output of the ASP and a wide dynamic range is obtained.

View from another aspect, the present invention is directed to an analog signal processor (ASP). The ASP comprises a plurality of substantially identical signal channels which are matched and balanced relative to each other. Each signal channel comprises a first portion having an input and an output with the input being adapted to receive a separate one of a plurality of analog signals, and further comprises a second portion having a signal node and a sampling switch with the sampling switch being coupled between the output of the first portion and the signal node. The second portion is adapted to sample analog signals received from the output of the first portion and to hold a signal level of a sampled analog signal. All of the sampling switches are essentially identical and are portions of a common integrated circuit and are located with respect to each other such that with common control signals applied thereto, the sampling switches all switch substantially in unison.

The invention will be better understood from a consideration of the following detailed description taken in conjunction with the accompanying drawings and claims.

DETAILED DESCRIPTION

Figure 1:
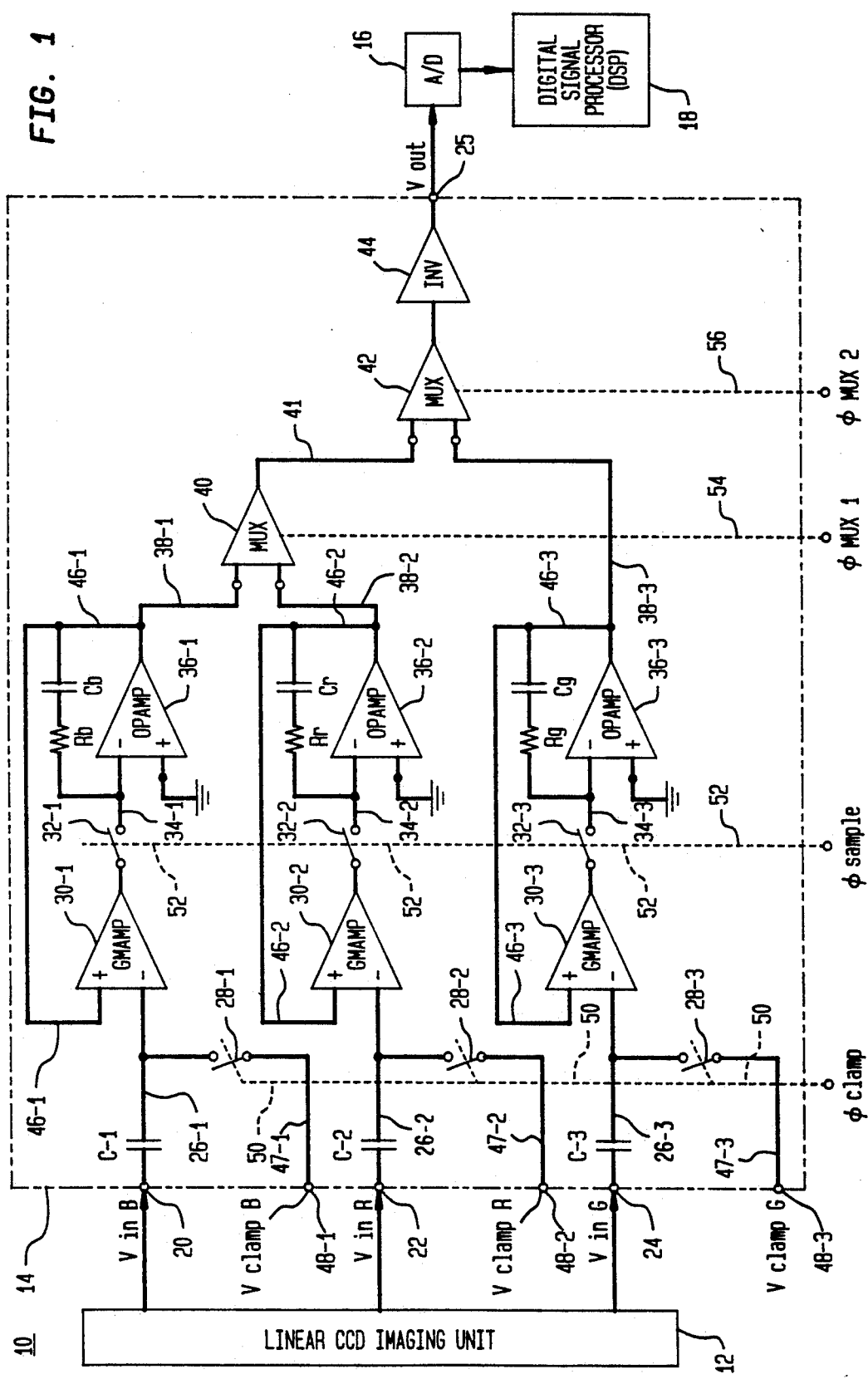
FIG. 1 shows a schematic circuit diagram of an electronic imaging system which comprises an analog signal processor (ASP) provided in accordance with the present invention.

Referring now to FIG. 1, there is shown a schematic diagram of an electronic imaging system 10 in accordance with the present invention. The imaging system 10 comprises a linear CCD imaging unit 12, an analog signal processor (ASP) 14 (shown within a dashed line rectangle), an analog to digital (A/D) converter 16, and a digital signal processor (DSP) 18. The linear CCD unit 12, which is of a type well known in the art, is scanned relative to a scene or an image focused on the linear CCD unit 12 to provide respective output color-component image signals "V in B", "V in R", and "V in G" (e.g., blue, red and green pixel image signals of balanced amplitude). These image signals "V in B", "V in R", and "V in G" are applied simultaneously though separately at the respective input terminals 20, 22 and 24 of the ASP 14. Output image signals "V out" (comprising in timed sequence the G, B, and R color-components) from the ASP 14 are generated at an output terminal 25 of ASP 14. Output terminal 25 is coupled to an input of the A/D converter 16 (well known in the art). An output of the A/D converter 16 is coupled to an input of the DSP 18 (also well known in the art). The image signals "V out" from the ASP 14 contain in sequence all of the G, B and R pixel color-components each now accurately referenced to a constant "zero" level and also amplitude balanced with respect to each other. Thus only a single A/D converter 16, rather than three separate ones, need be used in conjunction with the DSP 18. This arrangement not only reduces the number of elements needed (e.g., one A/D converter 16 instead of three), but also eliminates errors caused by additional components and associated timing and offset variations. Digital image signals, after processing within the DSP 18, may be stored in a suitable memory (not shown) such as a video compact disk ("Photo CD"), or otherwise utilized.

In accordance with one aspect of the invention, the ASP 14 is of novel architecture and the entire circuitry (to be described shortly) of the ASP 14 (with the exception of three externally provided coupling capacitors C-1, C-2 and C-3) can be fabricated as an IC on a single chip. Several operating benefits of this new architecture and important results flowing from the fact that the circuitry of the ASP 14 is extremely compact physically will be pointed out in detail hereinafter. The ASP 14 is uniquely adapted for operation in conjunction with the linear CCD imaging unit 12. Certain errors (albeit very small) which are inherent in previously known analog signal processing arrangements, are by virtue of the present invention, either avoided, or virtually eliminated. The result is that the ASP 14 achieves a dynamic range for a full color output signal of greater than 12-bits. In an illustrative embodiment, the ASP 14 operates with an input signal (peak-to-peak) as large as 2 volts and a throughput rate (e.g., the ASP output frequency) of up to about 20 MHz, with a power dissipation of well under 1 watt, and with an output impedance of less than about 25 ohms.

The ASP 14 simultaneously processes the three color-component pixel signals B, R and G applied as "V in B", "V in R", and "V in G" to its input terminals 20, 22 and 24 from the linear CCD imaging unit 12. A first signal channel of the ASP 14 which processes the "V in B" signals at the terminal 20 comprises a capacitor "C-1" which has a first terminal coupled to the input terminal 20. A second terminal of the capacitor C-1 is connected via a lead 26-1 to an upper terminal of a clamping switch 28-1 (shown schematically) and to a lower, negative (−) input of a transconductance amplifier (GMAMP) 30-1. An output of the GMAMP 30-1 is coupled to a first terminal of a sampling switch 32-1 (shown schematically). A second terminal of the switch 32-1 is coupled via a lead 34-1 (which serves as a hold node for sampled signals) to an upper, negative (−) input of an operational amplifier (OPAMP) 36-1. An output of the OPAMP 36-1 is coupled via a lead 38-1 to an upper input of a multiplex (MUX) unit 40 (well known in the art). An output of MUX unit 40 is coupled via a lead 41 to an upper input of a multiplex MUX unit 42 (substantially identical to the MUX 40). An output of the MUX unit 42 is coupled to an input of an inverter 44 (also well known in the art) having an output which is connected to the output terminal 25. The control and operation of the switches 28-1, 32-1 and of the multiplexing units 40 and 42 will be described in detail hereinafter.

Connected to the lead 38-1 at the output of the OPAMP 36-1 is a lead 46-1 which feeds back output voltage of the OPAMP 36-1 to an upper, positive (+) input of the GMAMP 30-1. Similarly, a "signal holding" capacitor "Cb" in series with a stabilizing resistor "Rb" feeds back from the lead 46-1 output voltage of the OPAMP 36-1 to its upper, negative (−) input and to the lead 34-1. A lower, positive (+) input of the OPAMP 36-1 is coupled to a reference potential, shown here as "ground". An arrangement substantially identical to the GMAMP 30-1, the sampling switch 32-1, the OPAMP 36-1, and their respective feedback loops is shown and described in the above-identified Nayebi and Wooley article, page 1508 and FIG. 1(c). This article is incorporated herein by reference. A detailed circuit of a transconductance amplifier is also described and shown on page 53, FIG. 3.5 of the above-identified Nayebi Thesis, which Thesis is incorporated herein by reference. A detailed description of an operational amplifier is shown on page 68, FIG. 3.15 of the Nayebi Thesis. However, the transconductance amplifier GMAMP 30-1 and the operational amplifier 36-1 herein have input buffers, such as junction field effect (J-FET) transistors (not shown) at their input (+) and (−) terminals for high input impedance, and biases are supplied by PNP bipolar transistors (not shown) instead of metal oxide semiconductor (MOS) transistors in the Nayebi circuits. For a given gain-bandwidth performance obtainable with the GMAMP 30-1 and the OPAMP 36-1, the open loop gain here is increased and the bandwidth is reduced in order to reduce noise since noise is related to bandwidth, other things being equal. The signal channels of the ASP 14 have small-signal bandwidths (e.g., about 25 MHz) lower than Nayebi, but also have lower noise and provide a greater than 12-bit dynamic range.

The "V in R" color-component signals applied to the input terminal 22 are simultaneously processed by a second signal channel of the ASP 14 identical to the elements just described (within the tight limits of microscopic component variations on a single IC chip). These elements have been given corresponding numbers to show their relationship to the elements previously described. Thus a first terminal of a capacitor "C-2" (corresponding to the capacitor C-1) is coupled to the terminal 22, and a second terminal thereof is coupled via a lead 26-2 to an upper terminal of a clamping switch 28-2 and to a lower, negative (−) input of a GMAMP 30-2 whose output is connected to a first terminal of a sampling switch 32-2, a second terminal of which is coupled via a lead 34-2 to an upper, negative (−) input of an OPAMP 36-2. An output of the OPAMP 36-2 is coupled via a lead 38-2 to a lower input of the MUX unit 40. A feedback lead 46-2 is coupled between the lead 38-2 and an upper, positive (+) input of the GMAMP 30-2.

Similarly, a feedback loop comprising a signal holding capacitor "Cr" and a stabilizing resistor "Rr" is connected between the lead 46-2 and an upper, negative (−) input of the OPAMP 36-2. A lower, positive (+) input of the OPAMP 36-2 is at a reference potential (e.g., ground potential).

A similarly identical third signal channel of the ASP 14 connected to the terminal 24 for processing "V in G" color-component signals comprises a capacitor "C-3" (corresponding to the capacitors C-1 and C-2) a clamping switch 28-3, a GMAMP 30-3, a sampling switch 32-3, an OPAMP 36-3, a feedback lead 46-3, and a feedback loop of a signal holding capacitor "Cg" in series with a stabilizing resistor "Rg". An output of the OPAMP 36-3 is coupled via a lead 38-3 to a lower input of the MUX unit 42.

The three clamping switches 28-1, 28-2, and 28-3 are identical to each other (within tight limits) and can be implemented as solid-state devices such as shown in FIG. 4.22, on page 127 of the above-identified Nayebi Thesis. It is advantageous however that biases here in the ASP 14 be provided by PNP transistors (not shown) instead of the MOS transistors in Nayebi's circuit.

The second terminal of the switch 28-1 herein is coupled to a lead 47-1 which in turn is coupled to an input terminal 48-1 to which a reference voltage "V clamp B" is applied. Similarly, a second terminal of the switch 28-2 is coupled to a lead 47-2 which in turn is coupled to an input terminal 48-2 to which a reference voltage "V clamp R" is applied; and a second terminal of the switch 28-3 is coupled to a lead 47-3 and thence to an input terminal 48-3 to which a reference voltage "V clamp G" is applied. Though not shown, where a single control of the "zero" level of each channel is desired, the terminals 48-1, 48-2, and 48-3 can be tied together.

The switches 28-1, 28-2 and 28-3 are actuated in unison by a control signal "∅ clamp" applied to them at substantially the same instant of time, as is indicated by a dashed line 50 and as will be explained shortly. When the switches 28-1, 28-2 and 28-3 (shown open) are momentarily closed by the control signal "∅ clamp", the second terminals of the capacitors C-1, C-2 and C-3 are each referenced with great accuracy to the voltages "V clamp B", "V clamp R" and "V clamp G" at the terminals 48-1, 48-2 and 48-3. The respective capacitors C-1, C-2 and C-3 and the clamping switches 28-1, 28-2 and 28-3 correspond to the capacitor "C1" and the clamp switch "1" shown in FIG. 5, page 4 of the above-identified White, et al. article, which article is hereby incorporated herein by reference. The ASP 14 provided by the present invention provides correlated double sampling (CDS) noise reduction as described in the White, et al. article. It is important to note that the accuracy of the reference voltages "V clamp B", "V clamp R" and "V clamp G" is obtained here for the ASP 14, all three signal channels of the ASP 14 being referenced to these voltages.

The three sampling switches 32-1, 32-2 and 32-3 are identical to each other (within tight limits) and can be implemented as solid state devices in the way described above in connection with the switches 28-1, 28-2 and 28-3. These sampling switches 32-1, 32-2 and 32-3 (shown open) are actuated in unison by a control signal "∅ sample" applied to them, as indicated by a dashed line 52, at substantially the same instant of time. Their precise, uniform actuation by the control signal "∅ sample" and the simultaneous opening of these sampling switches 32-1, 32-2 and 32-3 at substantially the same instant (within a few picoseconds) are important features of the present invention. This will be described in greater detail hereinafter.

When the sampling switch 32-1 of the first signal channel (for B color-component image signals) of the ASP 14 is closed, a signal current from the GMAMP 30-1 is applied via the lead 34-1 to the upper, negative input of the OPAMP 36-1. This in turn results in a voltage being stored on the holding capacitor Cb, which voltage corresponds substantially exactly to the voltage "V in B" then being applied to the input terminal 20. This "sample and hold" operation of the GMAMP 30-1, sampling switch 32-1, OPAMP 36-1, the feedback lead 46-1 and the feedback loop of the signal holding capacitor Cb and the stabilizing resistor Rb are described in detail in the above identified Nayebi and Wooley article. This circuit holds the voltage on the lead 34-1 substantially constant at a given potential (here referenced to "ground") regardless of wide swings in input image signal voltage applied via the lead 26-1 to the GMAMP 30-1. By holding the voltage on the lead 34-1 substantially constant, variations of an error (termed "pedestal error"), caused by "charge injection" on the opening of the sampling switch 32-1, are minimized. Charge injection (hence pedestal error) is still present whenever the switch 32-1 is opened, but it is constant each time the sampling switch 32-1 is opened and is independent of the magnitude of the input voltage at the input terminal 20. Thus the pedestal error is constant and is accurately offset against a reference voltage (e.g., "V clamp B") to obtain an extremely accurate representation of actual signal level by the voltage stored on the holding capacitor Cb. The second channel (for R signals) and the third channel (for G signals) of the ASP 14 are identical (within tight limits) to that of the first channel (described above), and their operation is the same.

The MUX unit 40 is actuated by a control signal "∅ MUX 1" applied thereto, as indicated by a dashed line 54. When the control signal "∅ MUX 1" goes high, the B color-component image signals applied via the lead 38-1 to the upper input of the MUX unit 40 are connected to the output lead 41. When the control signal "∅ MUX 1" goes low, the R image signals applied via the lead 38-2 to the lower input of the MUX unit 40 are connected to the output lead 41. In similar fashion, the MUX unit 42 is actuated by a control signal "∅ MUX 2" applied to it, as indicted by a dashed line 56. When the control signal "∅ MUX 2" goes high, the signals on the lead 41 (i.e., either B or R) are applied by the MUX unit 42 to the inverter 44 and then to the output terminal 25. When the control signal "∅ MUX 2" goes low, the G color-component signals on the lead 38-3 applied to the lower input of the MUX unit 42 are outputted to the inverter 44 and thence in inverted polarity to the output terminal 25. For negative-going image signals on the leads 41 and 38-3 (and the input terminals 20, 22 and 24), the output image signals "V out" are positive going.

Locating the MUX unit 40 and the MUX unit 42 physically next to the three signal processing channels of the ASP 14 and on the same IC chip, limits timing errors, offset level changes, and thermal effects. For a given throughput of image signals "V out", the three signal channels of the ASP 14 each operate at one-third of the frequency of the "V out" signals and this lower frequency of operation of the signal channels helps improve the overall dynamic range of the ASP 14, as is explained above. The time relationships of the respective image signals and of the control signals "∅ clamp", "∅ sample", "∅ MUX 1", and "∅ MUX 2" are described hereinafter.

Figure 2:
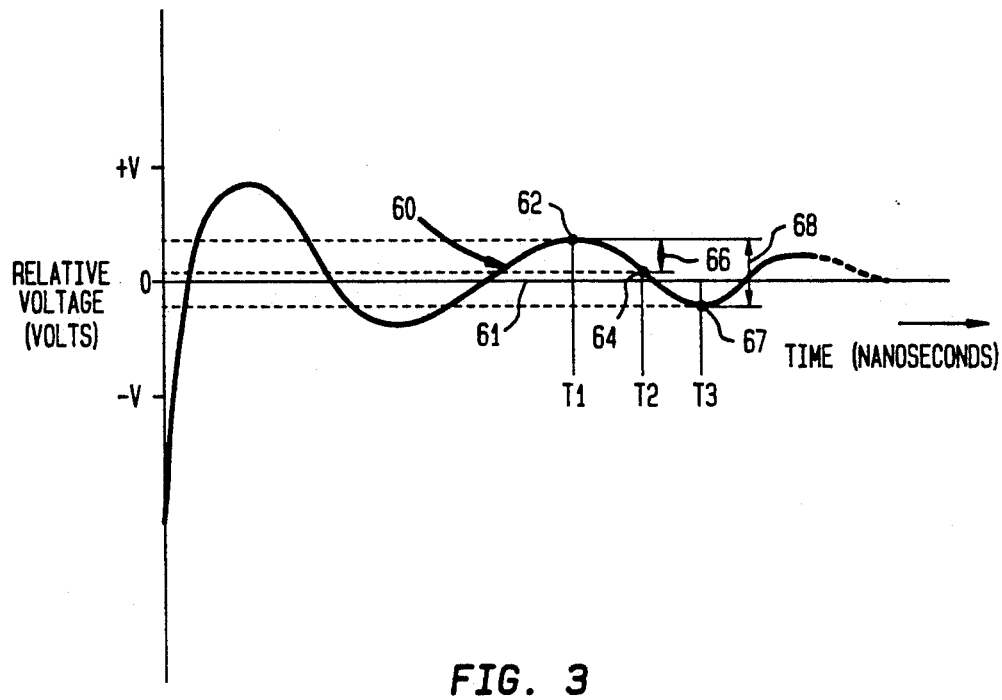
FIG. 2 shows a graph of a voltage waveform as a function of time illustrating low-level voltage variations due to "ringing" (circuit oscillations) and showing the differences in instantaneous voltage levels at times T1, T2 and T3.

Referring now to FIG. 2, there is shown a graph of a portion of a waveform 60 with relative voltage (volts) on a vertical axis and time (nanoseconds) on a horizontal axis. The waveform 60 is not to scale and an ending portion thereof is omitted. The waveform 60 illustrates low-level voltage variations due to "ringing" on the terminal 20 of the first channel of the ASP 14, for example. Such ringing is an electrical oscillation phenomenon well known in the art and as shown here begins at time "0". The result of "ringing" is a voltage (schematically represented by the waveform 60) which oscillates plus and minus for a time (many nanoseconds) while asymptotically approaching to a steady level 61 (illustrated here by the "0" of the horizontal axis). By way of explanation, it is to be understood that for a given signal sampling cycle, the "ringing" on the input terminal 22 of the second channel and the "ringing" on the input terminal 24 of the third channel of the ASP 14 are substantially identical to that of the first channel as illustrated by the waveform 60. This same oscillation (ringing) is superimposed on the output signals of the CCD imaging unit 12 at all three input terminals 20, 22, and 24.

If at a time T1, the image signal then on the input terminal 20 is stored on the hold capacitor Cb of the first channel of the ASP 14 by the opening of the sampling switch 32-1, the stored voltage is at a different (offset) level from the steady level 61, as is indicated by the level at a point 62 on the waveform 60. If the sampling switch 32-2 of the second channel, however, is opened at a somewhat later time T2, the stored voltage on the hold capacitor Cr of the second channel is as indicated by a point 64 on the waveform 60. The difference in voltage level at the point 62 and the level at the point 64, as indicated by a double headed arrow 66, can easily be a millivolt or so for a difference in the times T1 and T2 of only a few tens of picoseconds. Similarly, if the sampling switch 32-3 of the third channel is opened at a time T3, the stored voltage on the capacitor Cg is as indicated by a point 67 on the waveform 60. The difference in levels between the points 62 and 67 is indicated by a double headed arrow 68.

Because of "ringing", it is necessary in order to maintain uniform signal offset levels from channel to channel (e.g., uniform levels such as at the point 62 for all three channels) to eliminate timing differences (such as between T1 and T2 and between T1 and T3, in the actuation of the sampling switches 32-1, 32-2 and 32-3). Timing differences as small as a few tens of picoseconds in the actuation of these switches can cause sampling errors due to ringing, such as is illustrated in FIG. 2. These small timing differences are large enough to destroy a wide dynamic range (e.g., greater than 12-bits) for the ASP 14.

with previous analog signal processor arrangements where a separate processor IC or discrete components are used for each of the R, G and B color-component signals, the respective signal sampling switches (corresponding to the switches 32-1, 32-2, and 32-3) are physically separated on a circuit board by significant distances (e.g., inches). The difference of only an inch in the propagation path length along a conventional printed circuit board of a high frequency control signal, such as "∅ sample", can result in timing differences at the sampling switches of a hundred or more picoseconds. Thus with previous arrangements it is virtually impossible without difficult and expensive techniques to obtain very closely spaced (e.g., within ten picoseconds) times for actuation of the sampling switches. A maximum difference of less than ten picoseconds in the actuation of sampling switches 32-1, 32-2, and 32-3 is easily obtained because these sampling switches are physically located only a few mils (thousandths of an inch) apart and are identical (within tight limits). Similar precision in the actuation of the clamping switches 28-1, 28-2, and 28-3 is obtained in the same way. The three signal processing channels of the ASP 14 operate identically (within tight limits). Accordingly, small charge injection and signal sampling offsets within each channel and across the three channels are held essentially constant and are nulled out within extreme accuracy.

During operation of the ASP 14 thermal gradients (which are minor to begin with) within the single IC chip of the ASP 14 remain essentially constant. Temperature sensitive portions of the circuitry, such as input transistors (not shown) of the GMAMP's and OPAMP'S, the switches 28-1, 28-2 and 28-3, the switches 32-1, 32-2 and 32-3, and the MUX units 40 and 42 are respectively placed on the IC chip in accordance with a layout pattern which separates them from heat generating output transistors (not shown) and which further minimizes any effects of small thermal gradients which do exist. The three signal channels of the ASP 14 are thus substantially identically matched in their operating characteristics and offsets, and remain so under normal temperature differences. The B, R and G color-image signals on the respective leads 38-1, 38-2 and 38-3 to the MUX units 40 and 42 are each accurately referenced to a desired "zero" level by the reference voltages "V clamp B", "V clamp R", and "V clamp G". Critical timing and offset levels within the respective signal channels of the ASP 14 remain constant relative to each other even though the ASP 14 is in an environment (with other circuitry) where there are temperature variations.

Figure 3:
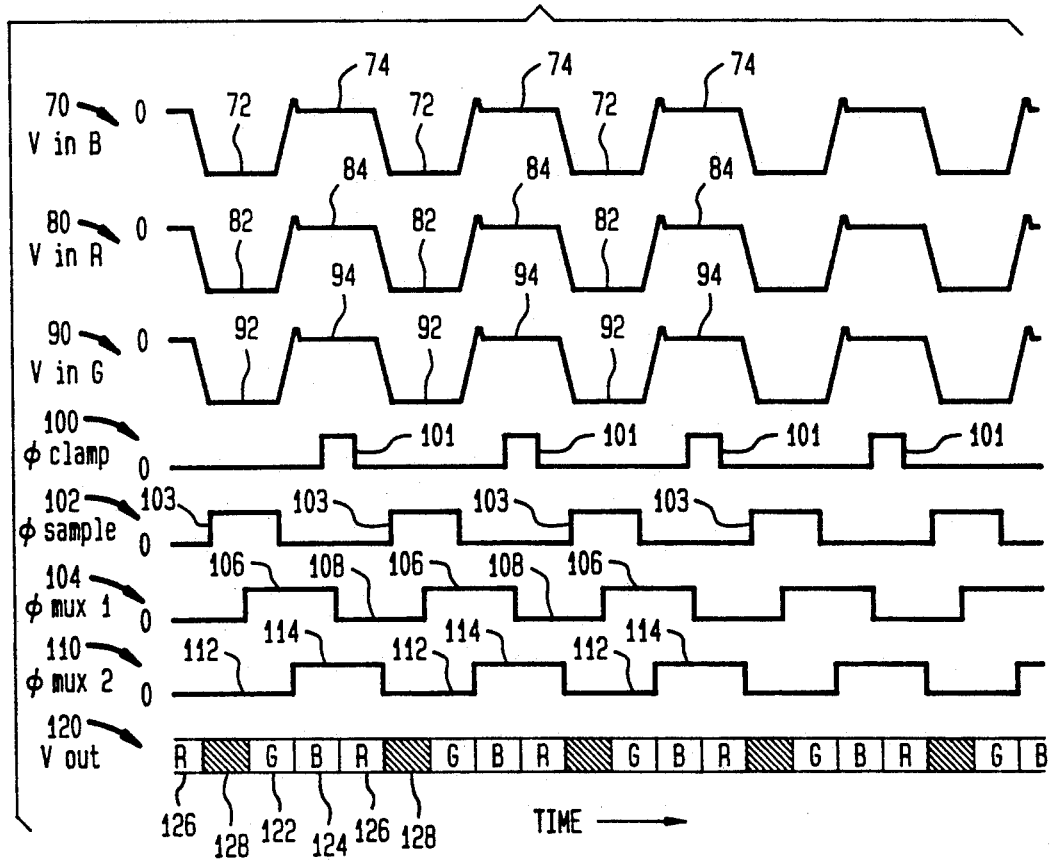
FIG. 3 shows (not to scale) timing relationships of various signals of the imaging system of FIG. 1.

Referring now to FIG. 3, there is shown a schematic diagram (not necessarily to scale) of the relationships with time of various signals in the ASP 14. Signal amplitude is indicated in the vertical direction, and time along the horizontal. The image signals "V in B" applied to the input terminal 20 are indicated here as a waveform 70 (beginning and ending portions of which are not shown). Waveform 70 is comprised of a timed sequence of pixel image output signals "V in B" 72 of the CCD imaging unit 12. Each pixel image signal 72 is a voltage pulse which is negative-going from a reset level, as indicated. The voltage levels of the pixel image signals 72 (shown here as all the same) vary as a function of the intensity of the light of an image impinging on the respective cells of the CCD imaging unit 12, as is well known in the art. The pixel image signals 72 are spaced apart by reset level intervals 74 during which the CCD imaging unit 12 is reset in preparation for the outputting of the next pixel image signal 72, and so on, as is also well known in the art.

In a typical application the maximum amplitude here, by way of example, of a pixel image signal 72 is 2 volts. The repetition rate of the pixel image signals 72, by way of example, is 5 MHz. The "V in R" signals applied to the input terminal 22 are indicated as a waveform 80, which has pixel image signals 82 and reset intervals 84. Similarly, the "V in G" signals applied to the input terminal 24 are indicated as a waveform 90 which has pixel image signals 92 and reset intervals 94. The pixel image signals 72, 82 and 92 coincide in time with respect to each other as do the reset intervals 74, 84 and 94. While the pixel image signals 72, 82 and 92 are shown here as having equal amplitudes, it is to be understood that these respective R, B and G signals are independent of each other, and vary in accordance with the R, B and G light intensities and the image pixels being reproduced by the CCD unit 12.

The "∅ clamp" control signal, indicated as a waveform 100, has positive-going pulses 101 which are approximately entered in time with respect to each of the reset intervals 74, 84 and 94. When a "∅ clamp" pulse 101 is present, the respective clamping switches 28-1, 28-2 and 28-3 are closed, and when the "∅ clamp" control signal is zero (no pulse 101), these clamping switches are open. The closing and opening of the clamping switches 28-1, 28-2 and 28-3 is closely controlled and provides referencing to "V clamp", as was previously explained.

The "∅ sample" control signal, which is indicated as a waveform 102, comprises a series of positive-going pulses 103 which are approximately centered in time with respect to each of the pixel image signals 72, 82 and 92. When a "∅ sample" pulse 103 is present, the respective sampling switches 32-1, 32-2 and 32-3 are closed, and when the "∅ sample" signal is zero (no pulse 103), the switches are open. For the reasons given previously (and see FIG. 2), the beginning and the end of each "∅ sample" pulse 103 applied to the sampling switches are very closely controlled in time (typically to within a few picoseconds). Thus the sampling switches 32-1, 32-2 and 32-3 are opened simultaneously (within a few picoseconds) upon the ending of a "∅ sample" pulse 103. The sequential operation of the clamping switches 28-1, 28-2 and 28-3 and the sampling switches 32-1, 32-2 and 32-3 provides the "correlated double sampling" noise reduction operation.

The "∅ MUX 1" control signal comprises a waveform 104 with a series of positive-going "on" or high intervals 106 separated by "off" or low intervals 108 of approximately equal duration. Similarly, the "∅ MUX 2" control signal comprises a waveform 110 with a series of "off" or low intervals 112 and a series of positive-going "on" or high intervals 114. Each high interval 106 of the "∅ MUX 1" waveform 104 begins approximately at the midpoint in time of a "∅ sample" pulse 103 and continues until well after the "∅ sample" pulse 103 has returned to zero. Each high interval 114 of the "∅ MUX 2" waveform 110 begins approximately at the midpoint in time of a high interval 106 of the waveform 104 and continues until approximately the midpoint of a low interval 108 of the waveform 104. The waveforms 104 and 110 are in effect merely square waves shifted half a period in time relative to each other, and are thus exactly synchronized. When the "∅ MUX 1" control signal is high (interval 106) the upper input of the MUX unit 40 is connected to the output lead 41, and when the "∅ MUX 1" control signal is low (interval 108) the lower input of the MUX unit 40 is connected to the lead 41. Similarly, when the "∅ MUX 2" control signal is high (interval 114), the upper input of the MUX unit 42 is connected to the inverter 44 (and then to terminal 25) of FIG. 1 and when low (interval 112) the lower input of the MUX unit 42 is connected to the inverter 44 of FIG. 1.

The synchronized operations of the MUX unit 40 and the MUX unit 42 thus produce the full color single channel output image signals "V out" as indicated schematically at 120. The sequential G, B and R color-component image signals of "V out" are indicated here respectively by blocks 122, 124 and 126. These sequential color-component signals are derived by the synchronized switching actions of the MUX units 40 and 42 and the inverter 44 from the simultaneous signal outputs of the OPAMP 36-1 (blue signals), the OPAMP 36-2 (red signals) and the OPAMP 36-3 (green signals) of FIG. 1. A cross-hatched block 128 indicates a portion of "V out" which is considered invalid (to be either ignored or subsequently removed). Each block 128 represents a short instant during an initial part of each sampling operation of the input image signals (e.g., "V in B", "V in R" and "V in G"). By way of example, for input image signals (e.g., each color component) having a frequency of 5 MHz, the full color output image signals "V out" have a frequency of 15 MHz. Circuits for generating the control signals "∅ clamp", "∅ sample", "∅ MUX 1" and "∅ MUX 2" are well known in the art and are not described herein.

It is to be understood that the imaging system 10 and the ASP 14 described herein are illustrative of the general principles of the invention. Modifications may readily be devised by those skilled in the art without departing from the spirit and scope of the invention. For example, the imaging system 10 is not limited to a particular imaging unit, or to three color components, or to the R, G and B colors described. Moreover, the ASP 14 is not limited to a particular input signal sampling rate, or to the voltage levels mentioned. The ASP 14 is not restricted to implementation into an IC by a particular process technology. The ASP 14 may be used in applications other than the imaging system 10.

What is claimed is:

1. An electronic imaging system comprising:
an imaging unit having a plurality of outputs for simultaneously producing respective color-component pixel image signals; and
an analog signal processor (ASP) for simultaneously processing the respective pixel image signals from the imaging unit to provide full color output image signals at an output thereof, the ASP comprising:
a plurality of substantially identical signal channels which are matched and balanced relative to each other, each signal channel comprising a first portion having an input and an output with the input being adapted to receive a separate one of the color-component signals, and further comprising a second portion having a signal node and a sampling switch with the sampling switch being coupled between the output of the first portion and the signal node;
the second portion having an output and being adapted to sample an analog signal received from the output of the first portion and to hold a signal level of said sampled analog signal;
all of the sampling switches being essentially identical and being portions of a common integrated circuit and being located with respect to each other such that with common control signals applied thereto, the sampling switches all switch substantially in unison; and
multiplexing means, which have inputs coupled to the outputs of the second portions of the signal channels and have an output coupled to the output of the ASP, for combining separate signals from the signal channels into full color output signals at the output thereof such that the separate signal channels, for a given signal throughput rate, operate at a frequency inversely proportional to the number of channels relative to the frequency of the full color signals at the output of the ASP and a wide dynamic range is obtained.

2. The electronic imaging system of claim 1 further comprising:
an analog to digital (A/D) converter coupled to the output of the ASP; and
a digital signal processor (DSP) coupled to an output of the A/D converter such that full color image signals in digital form are produced by the imaging system and an overall wide dynamic range is obtained.

3. An electronic imaging system comprising:
a linear charged coupled device imaging unit having a plurality of outputs for simultaneously producing respective color-component pixel image signals which are amplitude balanced and have a common dark level; and
an analog signal processor (ASP) having elements implemented on a single integrated circuit chip for simultaneously processing the pixel image signals received from the imaging unit to provide full color output image signals at an output thereof, the ASP comprising:
a plurality of signal channels which are matched in their operation and timing and balanced in their offsets relative to each other;
each signal channel comprising:
an input capacitor having first and second terminals with the first terminal being connected to a separate output of the imaging unit;
a clamping switch coupled to the second terminal of the input capacitor for coupling the second terminal to a reference voltage;
a transconductance amplifier (GMAMP) having first and second inputs and an output, a first input of the GMAMP being coupled to the second terminal of the input capacitor;
an operational amplifier (OPAMP) having first and second inputs and an output;
a sampling switch coupled between the output of the GMAMP and the first input of the OPAMP;
a first feedback loop coupled between the output of the OPAMP and the second input of the GMAMP;
a second feedback loop comprising a holding capacitor coupled between the output of the OPAMP and the first input of the OPAMP;
the second input of the OPAMP being adapted to be coupled to a reference potential;
the clamping switches being part of the integrated circuit chip and being essentially identical and located close together such that the clamping switches all switch substantially in unison;
the sampling switches being part of the integrated circuit chip and being essentially identical and located close together such that the sampling switches all switch substantially in unison; and
multiplex means coupled to the outputs of the OPAMPs for combining in timed sequence the separate color-component signals from the signal channels into the full color output signals at the output of the ASP such that the separate signal channels, for a given signal throughput, operate at a frequency lower than the frequency of the full color signals at the output of the ASP and a wide dynamic range is obtained.

4. The electronic imaging system of claim 3 further comprising:
an analog to digital (A/D) converter coupled to the output of the ASP; and
a digital signal processor (DSP) coupled to an output of the A/D converter such that full color image signals in digital form are produced by the imaging system and an overall wide dynamic range is obtained.

5. An analog signal processor (ASP) comprising:
a plurality of substantially identical signal channels which are matched and balanced relative to each other, each signal channel comprising a first portion having an input and an output with the input being adapted to receive a separate one of a plurality of analog signals, and further comprising a second portion having a signal node and a sampling switch with the sampling switch being coupled between the output of the first portion and the signal node;
the second portion being adapted to sample an analog signal received from the output of the first portion and to hold a signal level of the sampled analog signal;
all of the sampling switches being essentially identical and being portions of a common integrated circuit and being located with respect to each other such that with common control signals applied thereto, the sampling switches all switch substantially in unison; and
wherein the first portion of each signal channel further includes
a coupling capacitor having a first terminal which serves as an input of the ASP, and having a second terminal;
a clamping switch having a first terminal coupled to the second terminal of the coupling capacitor, and having a second terminal which is adapted to be coupled to a reference voltage; and
all of the clamping switches being essentially identical and being portions of the common integrated circuit and being located with respect to each other such that with common control signals applied to inputs thereof, the clamping switches all switch substantially in unison.

6. The ASP of claim 5 further comprising multiplexing means, which have inputs coupled to the outputs of the second portions of the signal channels and have an output coupled to the output of the ASP, for combining separate signals from the signal channels into full color output signals at the output thereof such that the separate signal channels, for a given signal throughput rate, operate at a frequency inversely proportional to the number of channels relative to the frequency of the full color signals at the output of the ASP and a wide dynamic range is obtained.

* * * * *